United States Patent
Izumida et al.

(10) Patent No.: US 10,940,783 B2
(45) Date of Patent: Mar. 9, 2021

(54) HEADREST GUIDE AND VEHICLE SEAT

(71) Applicant: TS TECH CO., LTD., Asaka (JP)

(72) Inventors: Makoto Izumida, Shioya-gun (JP); Naoki Kubo, Shioya-gun (JP); Mitsuru Nakamura, Nagoya (JP)

(73) Assignee: TS TECH CO., LTD., Asaka (JP)

( * ) Notice: Subject to any disclaimer, the term of this patent is extended or adjusted under 35 U.S.C. 154(b) by 0 days.

(21) Appl. No.: 16/493,341

(22) PCT Filed: Mar. 12, 2018

(86) PCT No.: PCT/JP2018/009363
§ 371 (c)(1),
(2) Date: Sep. 12, 2019

(87) PCT Pub. No.: WO2018/168724
PCT Pub. Date: Sep. 20, 2018

(65) Prior Publication Data
US 2020/0130549 A1    Apr. 30, 2020

(30) Foreign Application Priority Data
Mar. 13, 2017 (JP) .............................. JP2017-046943

(51) Int. Cl.
*B60N 2/80* (2018.01)
*B60N 2/897* (2018.01)
*B60N 2/809* (2018.01)

(52) U.S. Cl.
CPC ............. *B60N 2/897* (2018.02); *B60N 2/809* (2018.02)

(58) Field of Classification Search
CPC .......... B60N 2/897; B60N 2/809; B60N 2/80; B60N 2/806; B60N 2/882; B60N 2/894;
(Continued)

(56) References Cited

U.S. PATENT DOCUMENTS

2004/0021360 A1* 2/2004 Key ..................... B60N 2/80
297/452.18
2004/0201266 A1* 10/2004 Kreitler ................ B60N 2/809
297/410
(Continued)

FOREIGN PATENT DOCUMENTS

DE    102012100200    *   7/2013
JP    S63-25043 U       2/1988
(Continued)

OTHER PUBLICATIONS

May 29, 2018 International Search Report issued in International Patent Application No. PCT/JP2018/009363.
(Continued)

*Primary Examiner* — Mark R Wendell
(74) *Attorney, Agent, or Firm* — Oliff PLC

(57) ABSTRACT

This headrest guide 52 for holding a pillar 43 protruding from a headrest 4 is provided with cylindrical section 61 having formed therein a through-hole 63 which extends in a longitudinal direction and into which the pillar 43 is inserted. The cylindrical section 61 has a protrusion 64 provided on the inner peripheral surface of the through-hole 63 and coming in contact with the pillar 43 inserted in the through-hole 63. The protrusion 64 extends in the longitudinal direction of the cylindrical section 61, and the length of the protrusion 64 in the top-bottom direction is set to be greater than the length thereof in the left-right or front-rear direction. The configuration makes it possible to suppress the rattling of the headrest because of an increase in the region of contact with the pillar inserted in the through-hole.

10 Claims, 11 Drawing Sheets

(58) Field of Classification Search
CPC ........ B60N 2/812; B60N 2/818; B60N 2/815; B60N 2/821; B60N 2/0252; A61G 15/125; A47C 7/38
USPC ................................. 297/410, 391, 396, 397
See application file for complete search history.

(56) References Cited

U.S. PATENT DOCUMENTS

| | | | | |
|---|---|---|---|---|
| 2007/0108804 | A1* | 5/2007 | Adachi | B60N 2/80 297/61 |
| 2010/0194167 | A1* | 8/2010 | Gans | B60N 2/818 297/410 |
| 2010/0247235 | A1* | 9/2010 | Nishiura | B60N 2/888 403/311 |
| 2011/0248540 | A1* | 10/2011 | Yamada | B60N 2/818 297/391 |
| 2015/0210194 | A1* | 7/2015 | Furuta | B60N 2/7094 297/391 |
| 2015/0231997 | A1* | 8/2015 | Itoi | B23K 26/20 297/391 |
| 2016/0159259 | A1* | 6/2016 | Wehling | B60N 2/5816 297/391 |
| 2016/0339815 | A1* | 11/2016 | Mizobata | B60N 2/80 |
| 2016/0339816 | A1* | 11/2016 | Mizobata | B60N 2/80 |
| 2016/0339817 | A1* | 11/2016 | Mizobata | B60N 2/80 |
| 2017/0291515 | A1* | 10/2017 | Soltner | A47C 7/38 |
| 2020/0039403 | A1* | 2/2020 | Onuma | B60N 2/68 |

FOREIGN PATENT DOCUMENTS

| | | |
|---|---|---|
| JP | 2001-269242 A | 10/2001 |
| JP | 2001-275783 A | 10/2001 |
| JP | 2014-8335 A | 1/2014 |
| JP | 5592071 B2 | 9/2014 |

OTHER PUBLICATIONS

Sep. 17, 2019 International Preliminary Report on Patentability issued in International Patent Application No. PCT/JP2018/009363.

* cited by examiner

HEADREST GUIDE AND VEHICLE SEAT

TECHNICAL FIELD

The present invention relates to a headrest guide and a vehicle seat.

BACKGROUND

Conventionally, a technique for attaching headrest to a vehicle seat by inserting a pillar projecting from the headrest into a headrest guide provided for a seatback is known (for example, see Patent Document 1).

In the technique described in Patent Document 1, backlash of the headrest is suppressed by inserting a pressing piece into an opening formed in a tubular portion of the headrest guide so as to project into the inside of the tubular portion and pressing the pillar forward with this pressing piece.

PRIOR ART DOCUMENT

Patent Document

Patent Document 1: JP 5592071 B

SUMMARY

Problems to be Solved by the Invention

In the conventional structure for suppressing backlash of a headrest, an opening has to be formed in a tubular portion of a headrest guide, and further, a pressing piece to be inserted into this opening has to be molded integrally with the tubular portion or manufactured separately, which requires additional cost and labor related to manufacturing in some cases.

Thus, simplification of the structure for suppressing backlash of the headrest has been requested, but there is a problem in that it is difficult to suppress backlash of the headrest merely by eliminating the backlash suppression structure through use of the pressing piece.

The present invention was made in view of the above circumstances, and has an object to provide headrest guide and a vehicle seat that can suppress backlash of a headrest even with a simplified structure as compared with conventional structures.

Means for Solving Problems

In order to solve the above problem, the invention according to claim 1 is a headrest guide that holds a pillar projecting from a headrest, the headrest guide including:

a tubular portion with a through-hole which is formed along a length direction and through which the pillar is inserted, wherein the tubular portion has a protrusion provided on an inner peripheral surface of the through-hole to abut on the pillar inserted through the through-hole, and the protrusion extends along a longitudinal direction of the tubular portion, and a length in a vertical direction of the protrusion is set to be longer than a length in a lateral or fore-aft direction of the protrusion.

The invention according to claim 2 is the headrest guide according to claim 1, wherein the protrusion is provided on the inner peripheral surface of the through-hole in a range including a vicinity of a lower end part of the tubular portion.

The invention according to claim 3 is the headrest guide according to claim 1, wherein the protrusion projects from the inner peripheral surface of the through-hole along the fore-aft direction.

The invention according to claim 4 is the headrest guide according to claim 1, wherein the tubular portion has a second protrusion provided at a position opposite to the protrusion in the fore-aft direction on the inner peripheral surface of the through-hole.

The invention according to claim 5 is the headrest guide according to claim 4, wherein a length in the vertical direction of the second protrusion is set to be shorter than a length in the vertical direction of the protrusion, The invention according to claim 6 is the headrest guide according to claim 4, wherein a length in the lateral direction of the second protrusion is set to be shorter than a length in the lateral direction of the protrusion.

The invention according to claim 7 is the headrest guide according to claim 2, wherein the protrusion is provided below a central part in the vertical direction of the tubular portion, and the tubular portion has an upper protrusion spaced from the protrusion in the vertical direction on the inner peripheral surface of the through-hole and provided above a central part in the vertical direction of the tubular portion.

The invention according to claim 8 is the headrest guide according to claim 7, wherein a length in the vertical direction of the upper protrusion is set to be shorter than the length in the vertical direction of the protrusion.

The invention according to claim 9 is the headrest guide according to claim 7, wherein a plurality of the upper protrusions are provided on the inner peripheral surface of the through-hole, and the plurality of upper protrusions are arranged separately on left and right of the protrusion in a case of seeing through the tubular portion in a direction of seeing the protrusion in front.

The invention according to claim 10 is a vehicle seat, including:

the headrest guide according to claim 1;
a seat cushion that supports buttocks of an occupant;
a seatback attached rotatably to the seat cushion; and
a headrest provided at an upper part of the seatback,
wherein a seat frame constituting the seatback is provided with a holder that holds part of the tubular portion of the headrest guide, and at least part of the protrusion is provided on the inner peripheral surface of the through-hole in a region not held by the holder in the tubular portion.

Advantageous Effects of Invention

According to the invention of claim 1, since the length in the vertical direction of the protrusion extending along the longitudinal direction of the tubular portion is set to be longer than the length in the lateral or fore-aft direction, a range where the protrusion abuts on the pillar inserted through the through-hole increases.

Therefore, backlash of the headrest can be suppressed even with a simplified structure as compared with conventional structures.

According to the invention of claim 2, backlash of the headrest can be suppressed further in a case of inserting the pillar deep through the through-hole.

According to the invention of claim 3, backlash of the headrest in the fore-aft direction can be suppressed, According to the invention of claim 4, backlash of the headrest in the fore-aft direction can be suppressed further by means of the protrusion and the second protrusion opposite in the fore-aft direction.

According to the invention of claim 5, the sliding resistance to the pillar can be suppressed as compared with the protrusion. It is therefore possible to make it easier to insert the pillar into the through-hole while suppressing backlash of the headrest.

According to the invention of claim 6, the sliding resistance to the pillar can be suppressed as compared with the protrusion. It is therefore possible to make it easier to insert the pillar into the through-hole while suppressing backlash of the headrest.

According to the invention of claim 7, the protrusion and the upper protrusion abut on the pillar at the positions spaced vertically, and backlash of the headrest can be suppressed further.

According to the invention of claim 8, a range where the upper protrusion abuts on the pillar is narrowed, and the sliding resistance to the pillar can be suppressed as compared with the protrusion. It is therefore possible to make it easier to insert the pillar into the through-hole.

According to the invention of claim 9, the protrusion and the plurality of upper protrusions spaced in the vertical direction and in the lateral direction abut on the pillar. Therefore, backlash of the headrest can be suppressed further.

According to the invention of claim 10, part of the tubular portion can be held by the holder provided at the upper part of the seat frame constituting the seatback. Therefore, backlash of the headrest can be suppressed while allowing the headrest with the pillar inserted through the through-hole of the tubular portion to follow the movement of seat arrangement.

In addition, at least part of the protrusion is provided on the inner peripheral surface of the through-hole in the region of the tubular portion not held by the holder. Therefore, the headrest guide easily deflects, which contributes to a reduction in operation load on the headrest.

EMBODIMENTS FOR CARRYING OUT THE INVENTION

Hereinafter, an embodiment of the present invention will be described with reference to the drawings. Note that, although technically preferable various limitations are added to an embodiment which will be described in order to carry out the present invention, the technical scope of the present invention is not limit to the following embodiment and illustrated examples.

Figure 1:
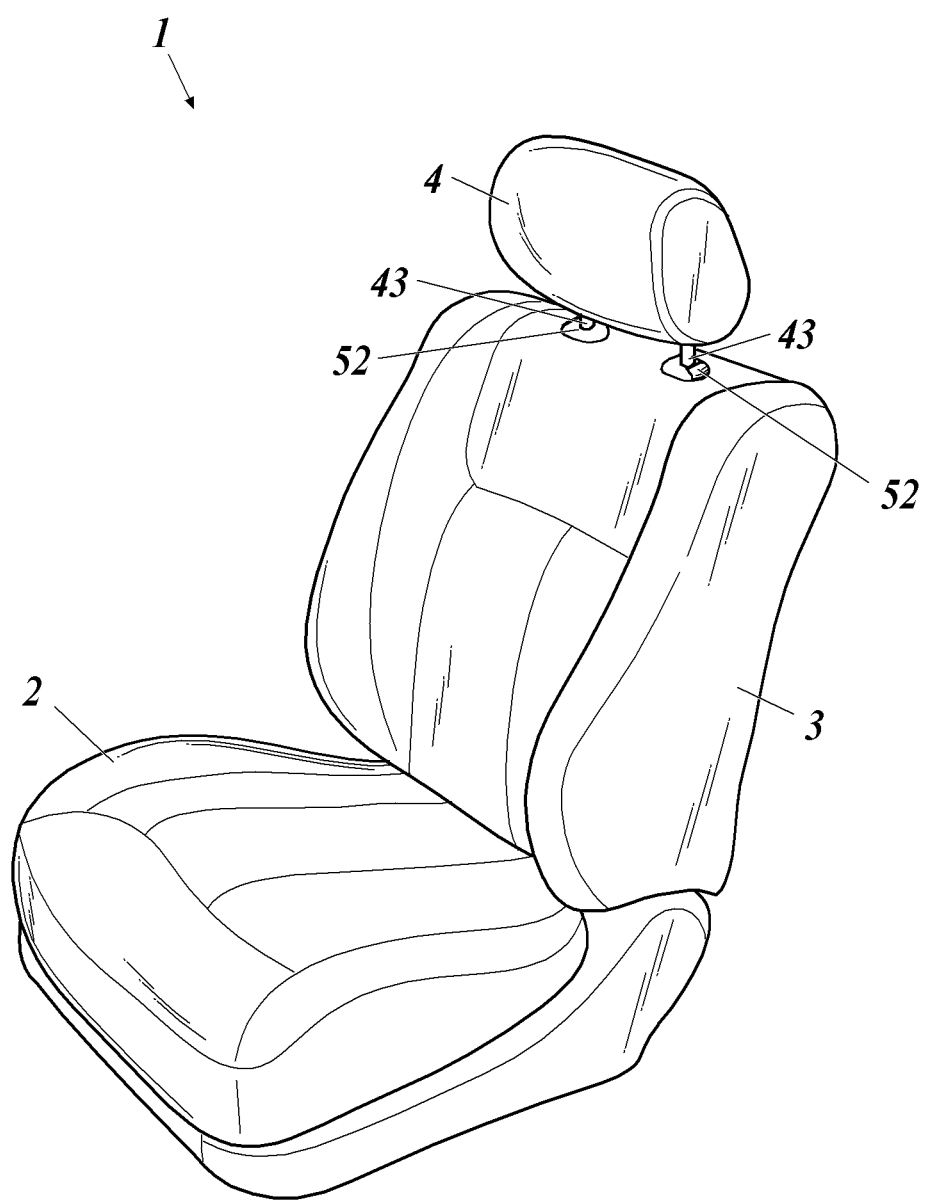
FIG. 1 is a perspective view showing a vehicle seat.

In FIG. 1, a vehicle seat is indicated by the reference character 1. This vehicle seat 1 includes a seat cushion 2 that supports buttocks of an occupant, a seatback 3 attached rotatably to the seat cushion 2, and a headrest 4 provided at the upper part of the seatback 3.

The seat cushion 2 is composed of a frame (not shown) covered with a cushion, and receives and holds the buttocks and the femora of an occupant.

In addition, this seat cushion 2 is coupled to the floor of a vehicle via a fore-aft position adjustment mechanism and a height adjustment mechanism. The fore-aft position is adjusted with the fore-aft position adjustment mechanism, and the height is adjusted with the light adjustment mechanism. Note that conventionally-known mechanisms can be used for these fore-aft position adjustment mechanism and height adjustment mechanism.

Figure 2:
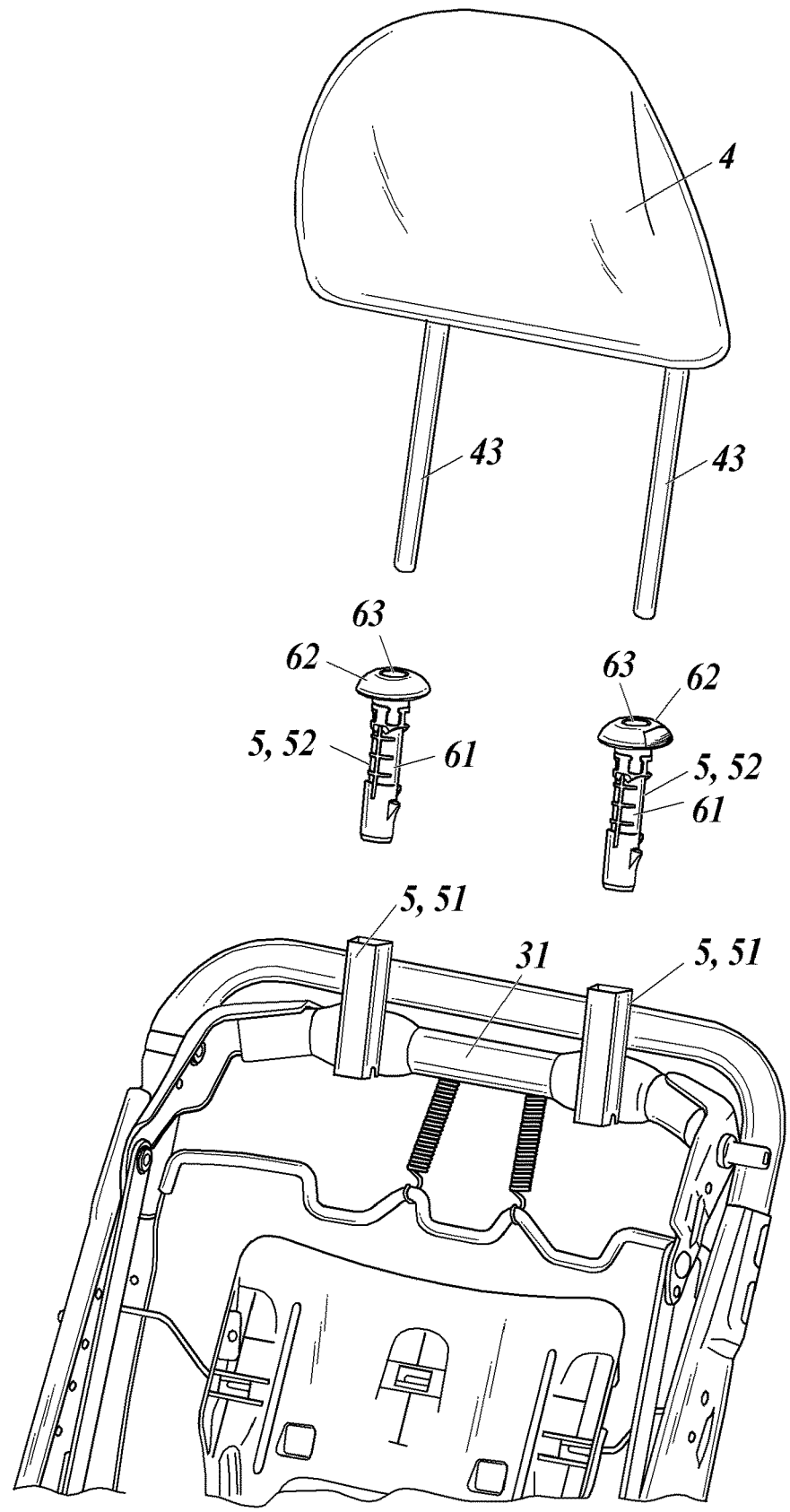
FIG. 2 is a perspective view showing a structure for supporting a headrest.
Figure 3:
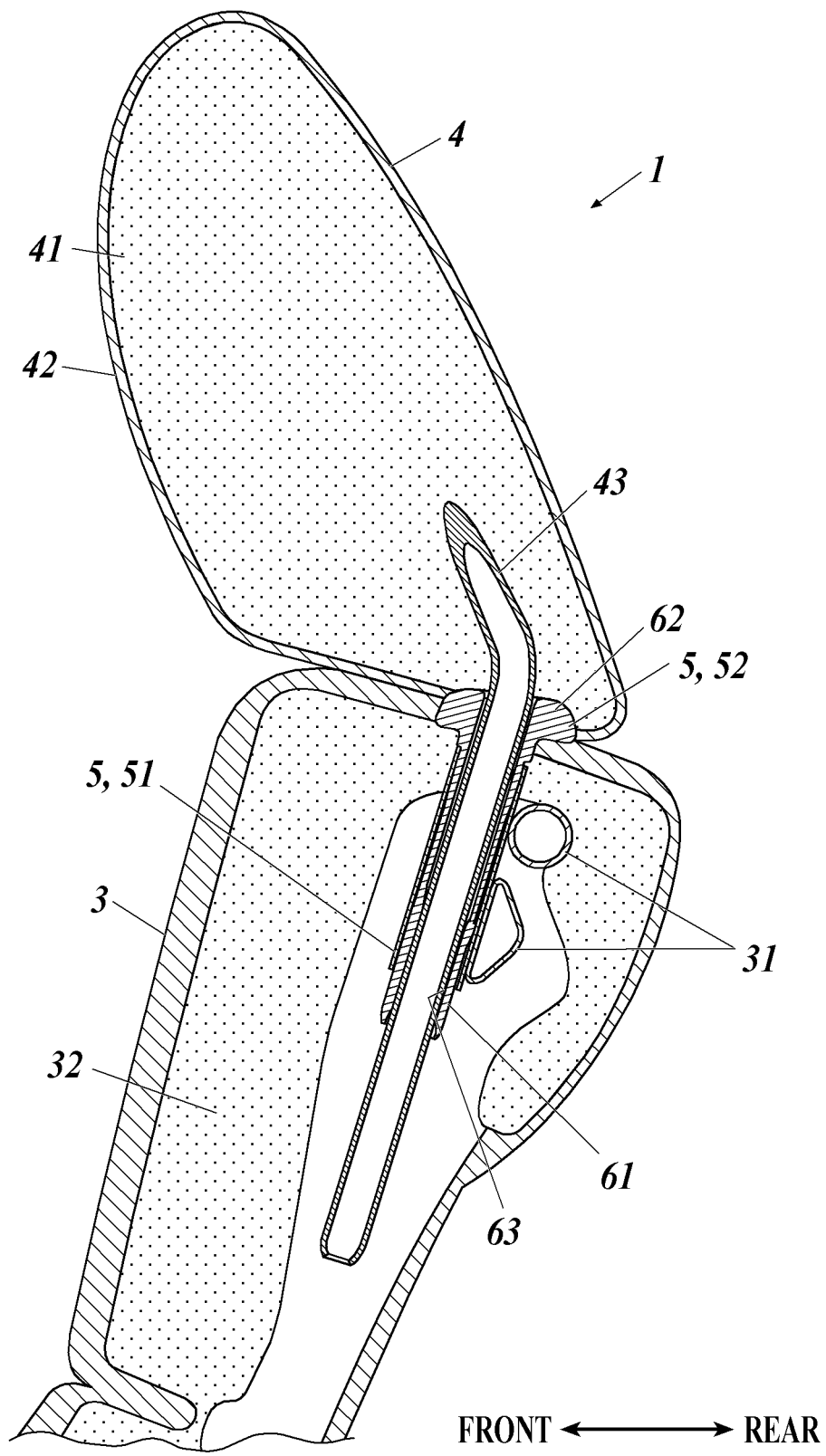
FIG. 3 is a cross sectional view showing an upper end part of the vehicle seat.
Figure 4:
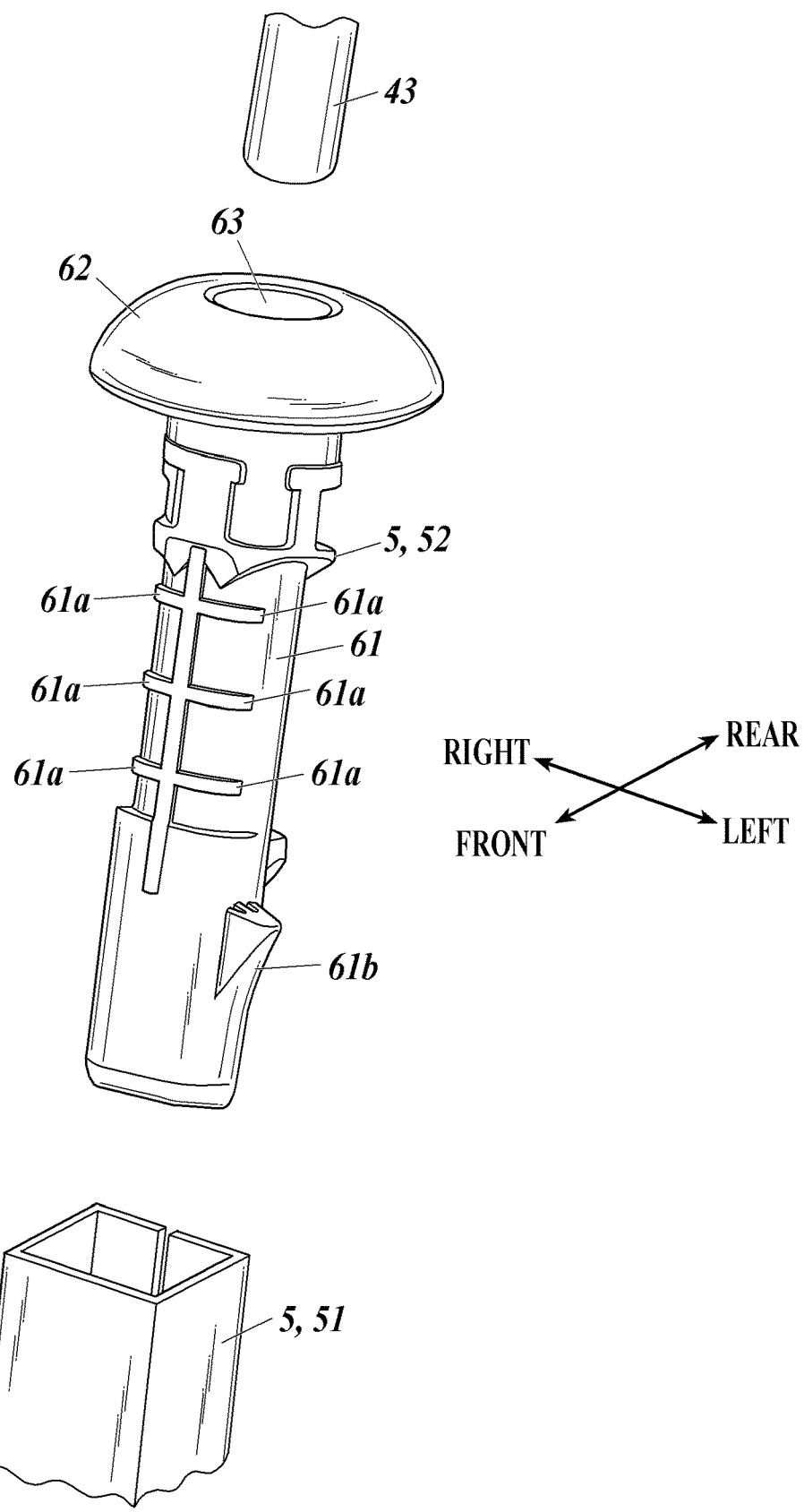
FIG. 4 is an exploded perspective view showing an essential the structure for supporting the headrest.

The seatback 3 is a backrest coupled to rear end part of the seat cushion 2 via a reclining mechanism, and as shown in FIG. 2 and FIG. 3, includes a seat frame 31 and a cushion 32 covering the seat frame 31.

The reclining mechanism adjusts the angle of the seatback 3 with respect to the seat cushion 2. The reclining mechanism allows the seatback 3 to be put back, put up, and locked to maintain its angle. Note that, by causing the reclining mechanism and the above-described fore-aft position adjustment mechanism and height adjustment mechanism in the seat cushion 2 to function, seat arrangement for the vehicle seat 1 can be performed.

The headrest 4 receives and supports the head of an occupant, and as shown in FIG. 3, has a pad portion 41, a cover 42 covering the pad portion 41, and a plurality of pillars 43 (two in the present embodiment) projecting downward from the lower end part.

This headrest 4 is supported on the seatback 3 by means of a support mechanism 5 provided for the seat frame 31 of the seatback 3.

Figure 10:
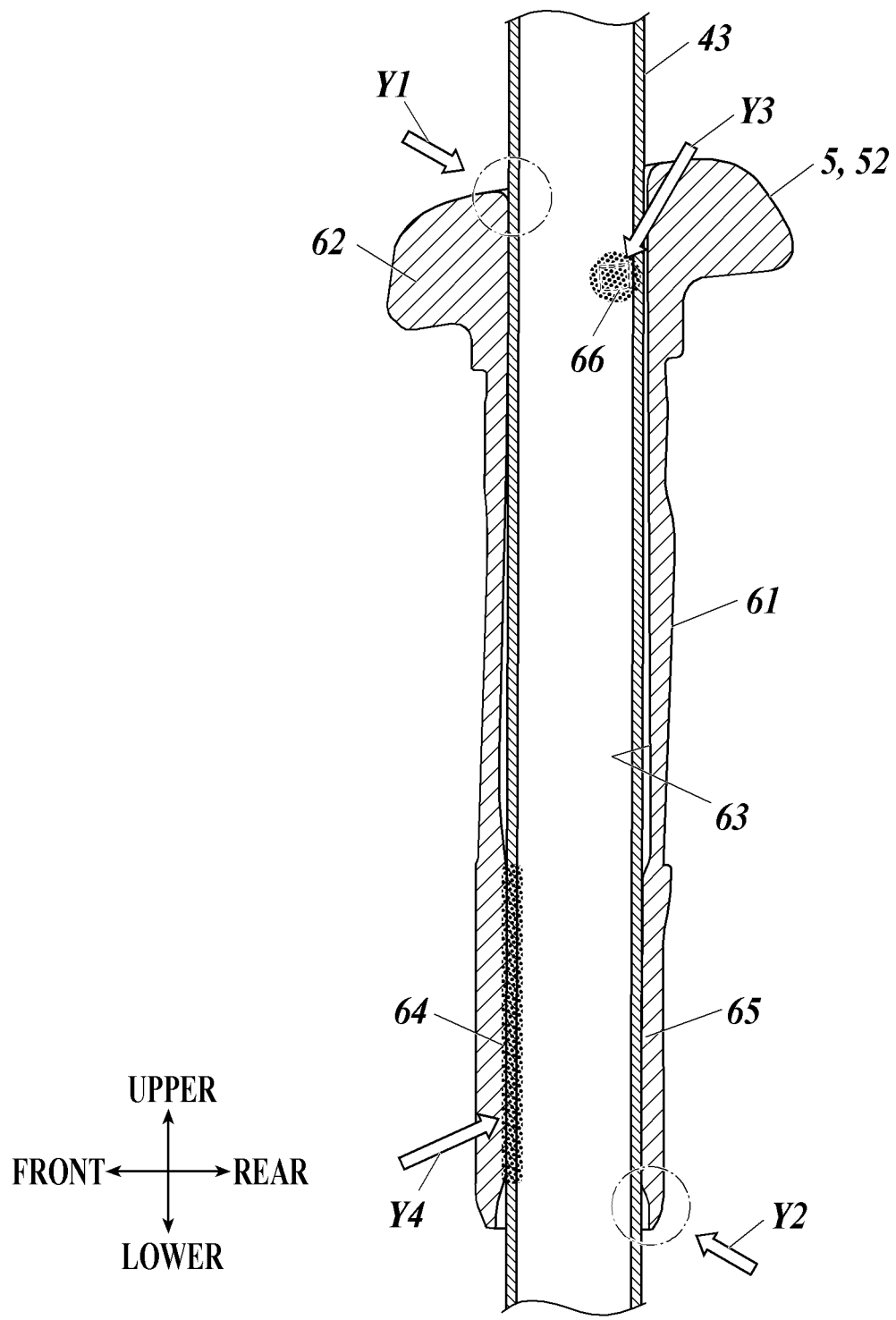
FIG. 10 is a cross sectional view describing a touching state of a pillar and a plurality of protrusions.
Figure 11:
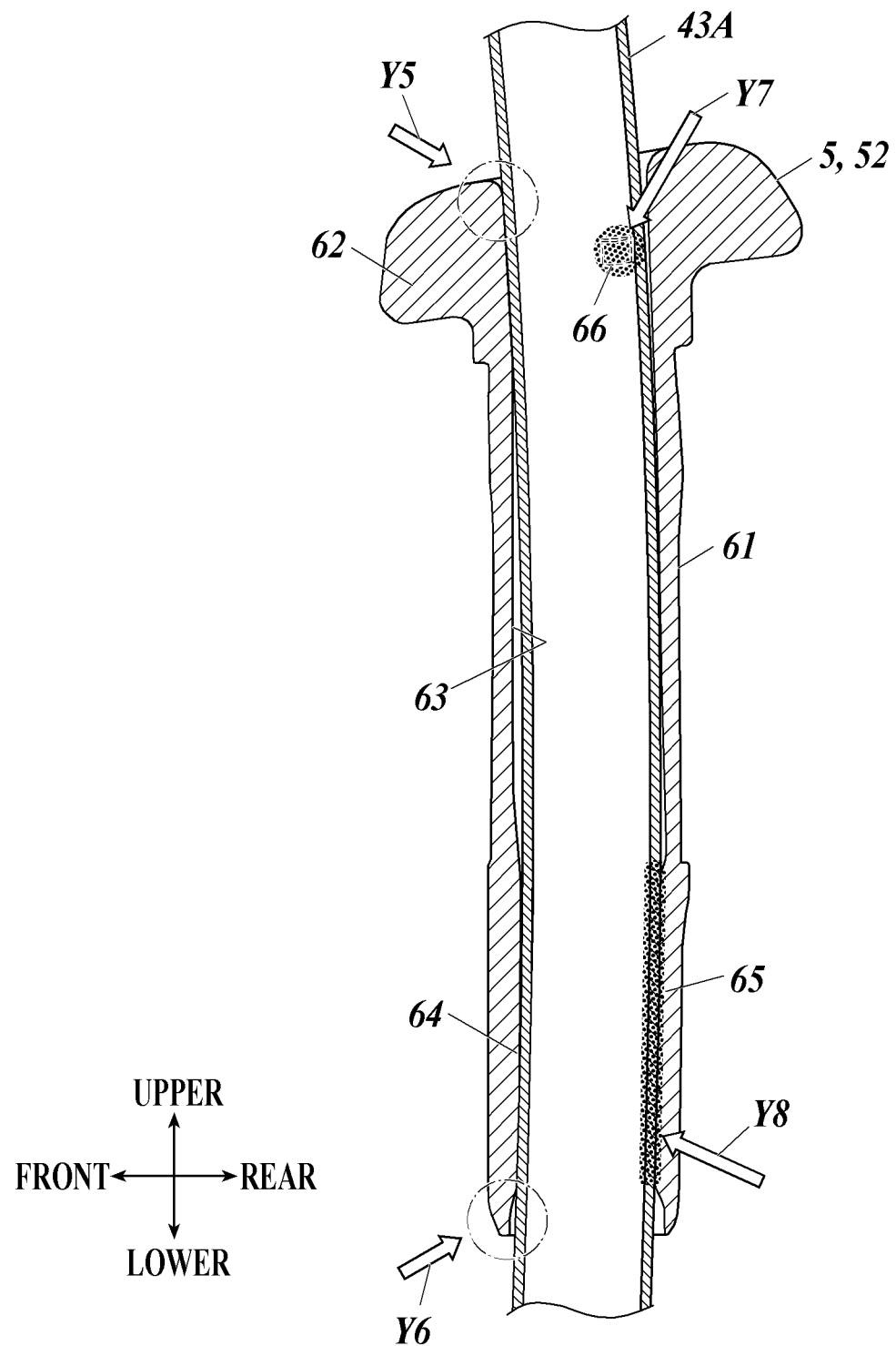
FIG. 11 is a cross sectional view describing a touching state of another pillar and a plurality of protrusions

Note that, for the plurality of pillars 43, pillars projecting straight downward from the lower end part of the headrest 4 and pillars projecting downward while being curved forward or rearward can be employed (see FIG. 10 and FIG. 11).

The support mechanism 5 includes a holder 51 provided for the seat frame 31 of the seatback 3 and a headrest guide 52 held by the holder 51, as shown in FIG. 2 to FIG. 5. A plurality of combinations of these holder 51 and headrest guide 52 are provided in correspondence to the plurality of pillars 43, as shown in FIG. 2.

The holder 51 holds part of a tubular portion (which will be described later) of the headrest guide 52, and is formed as a rectangular tube. This holder 51 has its lower rear surface bonded to the upper front surface of the seat frame 31 by welding or the like, and extends vertically in the inside of the seatback 3.

Note that the holder 51 shall be formed by winding a metal plate as a rectangular tube by bending.

The headrest guide holds a pillar 43 projecting from the headrest 4, and is obtained by mold synthetic resin into a tubular shape. In addition, this headrest guide 52 has a head 62 and a tubular portion 61 suspending downward from the head 62.

A through-hole 63 through which the pillar 43 is to be inserted is formed in the headrest guide 52 along the entire length. That is, through-hole 63 extends through from the upper end surface of the head 62 to the lower end of the tubular portion 61. In addition, the through-hole 63 formed linearly along the length direction of the headrest guide 52.

Note that one of the plurality of headrest guides 52 is provided with an adjustment knob that enables the height of the headrest 4 to be adjusted.

The tubular portion 61 occupies most of the entire length of the headrest guide 52, and is formed linearly along the length direction of the headrest guide without being curved.

A plurality of integrally formed ribs 61*a* are formed on the front side surface of this tubular portion 61. The tubular portion 61 including the plurality of ribs 61*a* is set at a size corresponding to the inner dimensions of the holder 51.

In addition, pawls 61*b* projecting to the outer side are provided on both side surfaces of the lower part of the tubular portion 61. The pawls 61*b* are formed integrally with the tubular portion 61 by cutting out both the side surfaces of the lower part of the tubular portion 61 into a state where the lower end parts of the pawls 61*b* are left. The pawls 61*b* brought into the state where the lower end parts are left in this manner are elastically movable in inward and outward directions of the tubular portion 61 with the lower end parts serving as basic points, and in a state where the pillar 43 has not been inserted through the through-hole 63, the pawls 61*b* can be moved so as to enter the inner side of the through-hole 63. Thus, in a case of inserting/withdrawing the headrest guide 52 into/from the holder 51, insertion/withdrawal can be performed by allowing the pawls 61*b* to enter the through-hole 63 side, and in a case where the headrest guide 52 is mounted on the holder 51, the pawls 61*b* function as withdrawal stops for the headrest guide 52.

The head 62 is provided so as to extend into a collar shape (also referred to as a flange shape) with respect to the tubular portion 61. That is, the head 62 is provided to project to a radially outer side orthogonal to the axial direction of the headrest guide 52.

This head 62 is exposed at the upper end surface of the seatback 3 when the headrest guide 52 is held by the holder 51 and provided in the seatback 3. Therefore, the through-hole 63 is brought into a state of being open at the upper end surface of the seatback 3.

As shown in FIG. 6 to FIG. 9, a protrusion 64, a second protrusion 65, and upper protrusions 66 to abut on the pillar 43 inserted through the through-hole 63 are provided on the inner peripheral surface of the through-hole 63.

In other words, the tubular portion 61 has the plurality of protrusions 64, 65, and 66 provided on the inner peripheral surface of the through-hole 63 to abut on the outer peripheral surface of the pillar 43 inserted through the through-hole 63. In addition, these plurality of protrusions 64, 65, and 66 are formed integrally with the inner peripheral surface of the through-hole.

Figure 6:
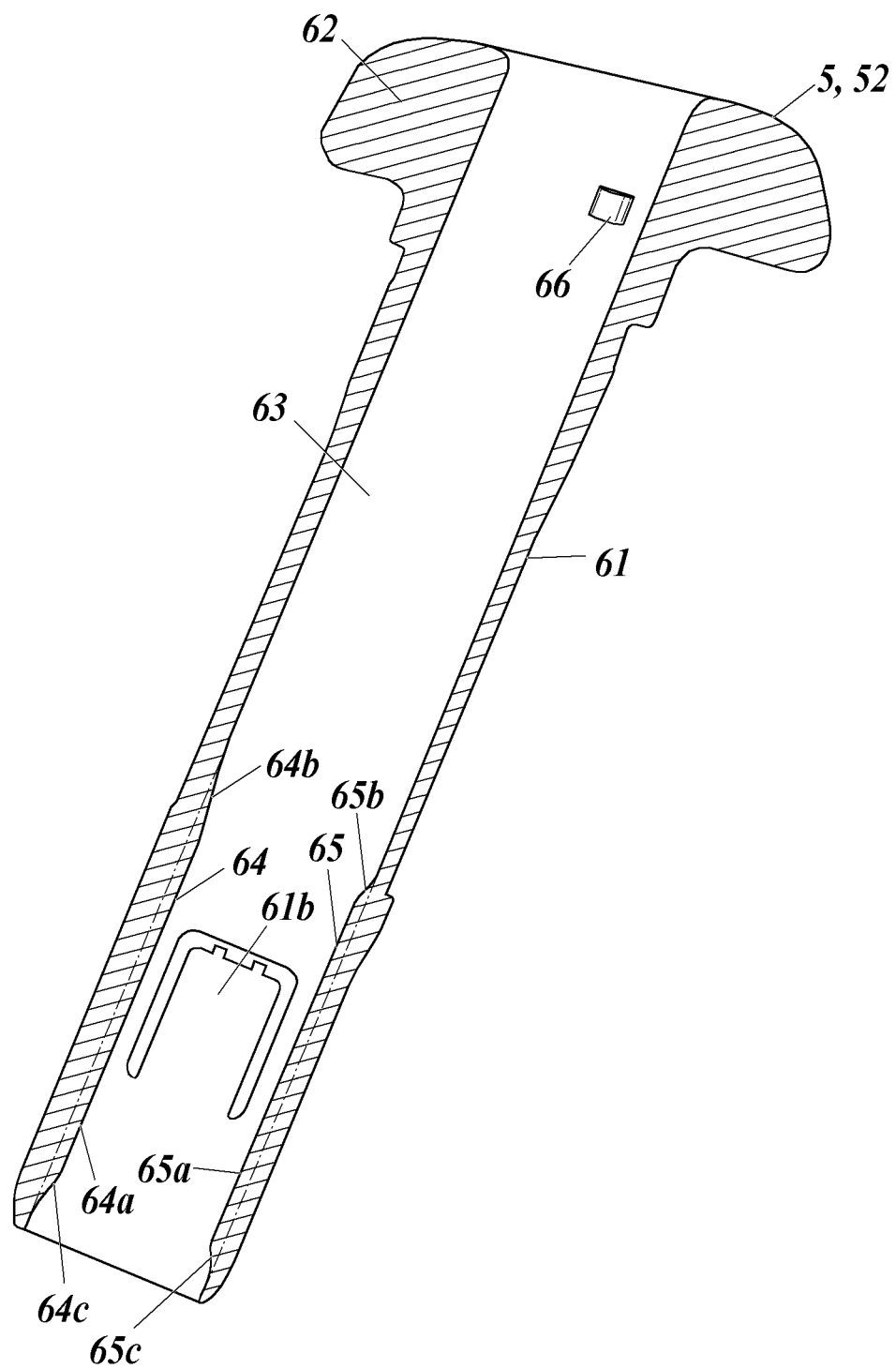
FIG. 6 is a cross sectional view showing a headrest guide as seen transversely.
Figure 7:
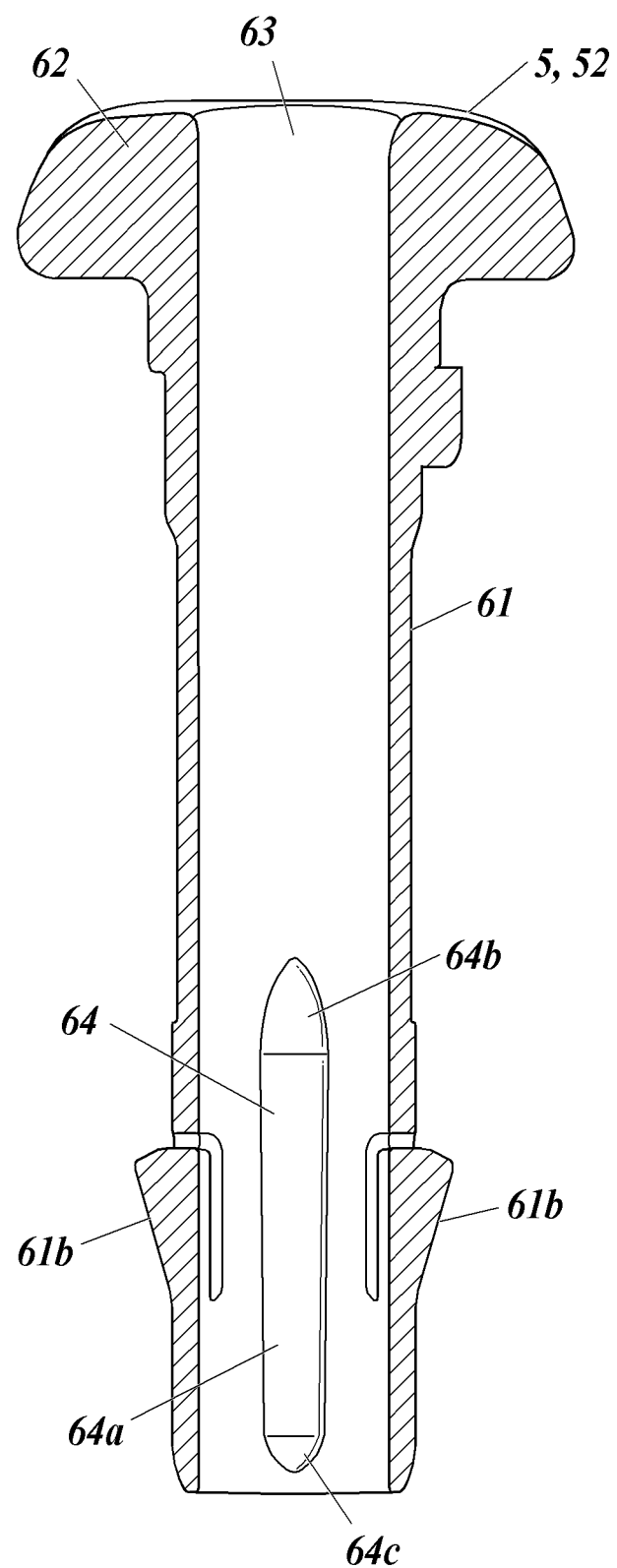
FIG. 7 is a cross sectional view showing the headrest guide as seen from the back.

As shown in FIG. 6 and FIG. 7, the protrusion 64 extends along the longitudinal direction the tubular portion 61, and its length in the vertical direction is set to be longer than the length in the lateral or fore-aft direction. That is, the protrusion 64 is an elongated projection formed long along the longitudinal direction of the tubular portion 61.

In addition, the protrusion 64 is provided on the inner peripheral surface of the through-hole 63 in a range including the vicinity of the lower end part of the tubular portion 61. Describing in more detail, the protrusion 64 is provided below the central part in the vertical direction of the tubular portion 61, an its lower end part is in a state not reaching the lowermost end of the tubular portion 61.

Further, the protrusion 64 projects from the inner peripheral surface of the through-hole 63 along the fore-aft direction. Specifically, the protrusion 64 is formed so as to project rearward from the front side surface of the inner peripheral surface of the through-hole 63.

The protrusion 64 includes an abutting surface 64*a*, an upper inclined surface 64*b*, and a lower inclined surface 64*c*.

The abutting surface 64*a* is a surface to abut on the outer peripheral surface of the pillar 43 when the pillar 43 is inserted through the through-hole 63, and is formed long along the longitudinal direction of the tubular portion 61.

The upper inclined surface 64*b* is positioned at the upper end part of the protrusion 64, continuous with the abutting surface 64*a*, and inclined from the abutting surface 64*a* toward the inner peripheral surface of the through-hole 63.

The lower inclined surface 64*c* is positioned at the lower end part of the protrusion. 64, continuous with the abutting surface 64*a*, and inclined from the abutting surface 64*a* toward the inner peripheral surface of the through-hole 63.

Note that the upper inclined surface 64*b* and the lower inclined surface 64*c* are both formed such that lateral width dimension is narrowed gradually toward the inner peripheral surface of the through-hole 63.

Figure 8:
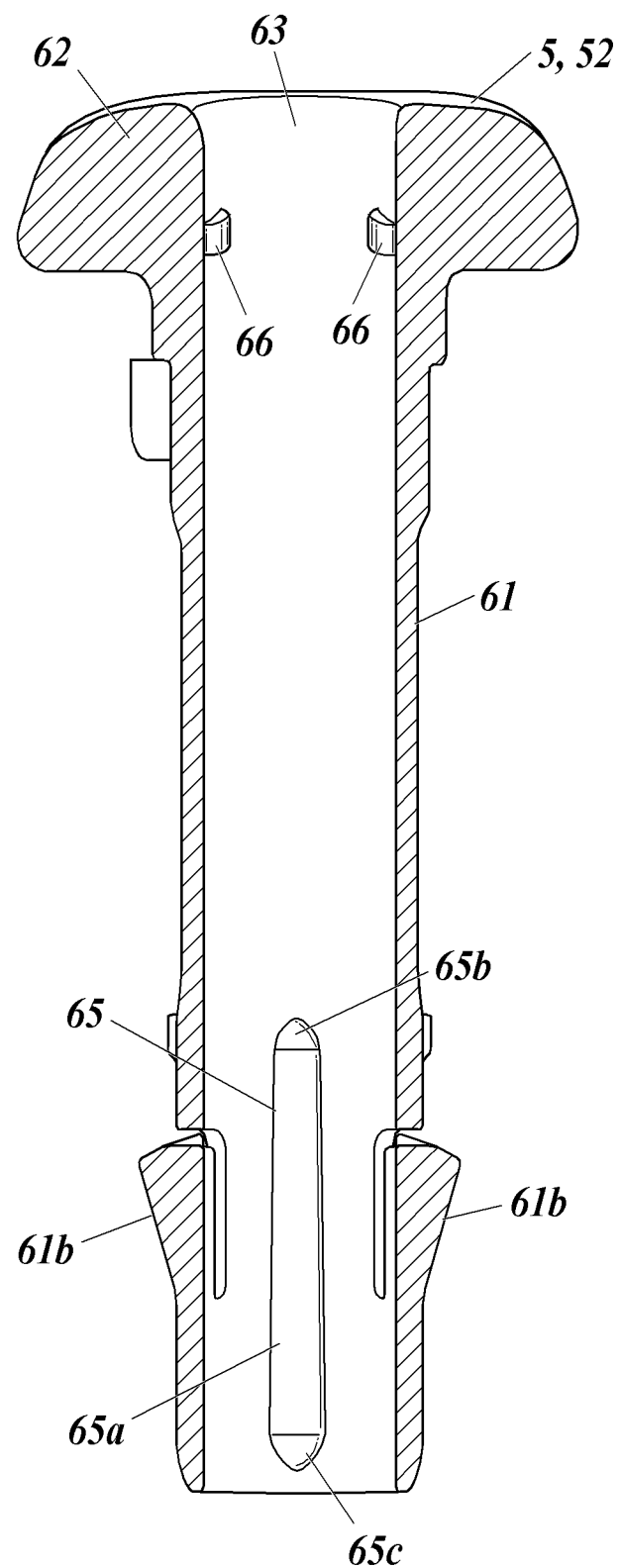
FIG. 8 is a cross sectional view showing the headrest guide as seen from the front.

The second protrusion 65 is provided at a position opposite to the protrusion 64 in the fore-aft direction on the inner peripheral surface of the through-hole 63, as shown in FIG. 6 and FIG. 8. Since the protrusion 64 is provided on the front side surface of the inner peripheral surface of the through-hole 63, the second protrusion 65 is formed so as to project forward from the rear side surface of the inner peripheral surface of the through-hole 63.

This second protrusion 65 includes an abutting surface 65*a*, an upper inclined surface 65*b*, and a lower inclined surf 65*c*.

The abutting surface 65*a* is a surface to abut on the outer peripheral surface of the pillar 43 when the pillar 43 is inserted through the through-hole 63, and is formed long along the longitudinal direction of the tubular portion 61.

The upper inclined surface 65*b* is positioned at the upper end part of the second tri. 65, continuous with the abutting surface 65*a*, and inclined from the abutting surface 65*a* toward the inner peripheral surface of the through-hole 63.

The lower inclined surface 65*c* is positioned at the lower end part of the second protrusion 65, continuous with the abutting surface 65*a*, and inclined from the abutting surface 65*a* toward the inner peripheral surface of the through-hole 63.

Note that the upper inclined surface 65*b* and the lower inclined surface 65*c* are both formed such that the lateral width dimension is narrowed gradually toward the inner peripheral surface of the through-hole 63.

In addition, the second protrusion 65 is an elongated projection formed long along the longitudinal direction of the tubular portion 61 similarly to the protrusion 64, while the length in the vertical direction of the second protrusion 65 is set to be shorter than the length in the vertical direction of the protrusion 64. The position of the lower end part of second protrusion 65 is in a state of not reaching the lowermost end of the tubular portion 61 similarly to the protrusion 64. Note that the length in the vertical direction as referred to herein indicates the length in the vertical direction of the entire protrusion 64 and the length in the vertical direction of the entire second protrusion 65.

Further, the length in the lateral direction of the second protrusion 65 is set to be shorter than the length in the lateral direction of the protrusion 64. Note that the length in the lateral direction as referred to herein indicates the length in the lateral direction of the abutting surface 64a of the protrusion 64 and the length in the lateral direction of the abutting surface 65a of the second protrusion 65. In a case of comparing the lengths in the lateral direction of the protrusion 64 and the second protrusion 65, the mutual abutting surfaces 64a and 65a are compared.

Figure 9:
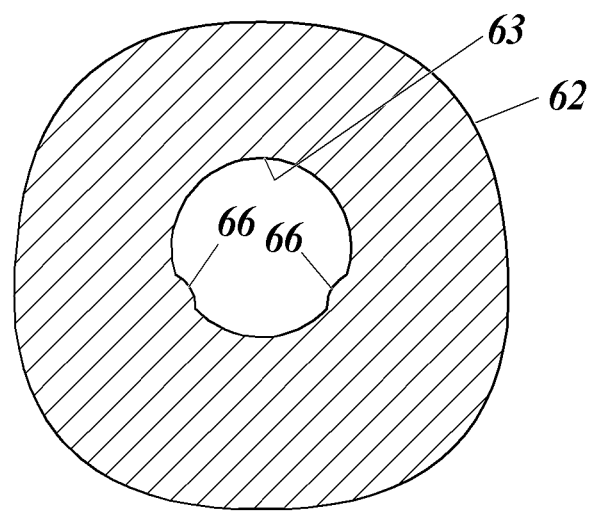
FIG. 9 is a cross sectional view showing the position of upper protrusions.

The upper protrusions 66 are spaced from the protrusion 64 in the vertical direction on the inner peripheral surface of the through-hole 63, and provided above the central part in the vertical direction of the tubular portion 61, as shown in FIG. 6, FIG. 8 and FIG. 9. Describing specifically, the upper protrusions 66 are provided on the inner peripheral surface of the through-hole 63 formed in the head 62 of the headrest guide 52.

The length in the vertical direction of these upper protrusions 66 is set to be shorter than the length in the vertical direction of the protrusion 64. In addition, the length in the vertical direction is also set to be shorter than that of the second protrusion 65. Further, the width dimension is also set to be shorter than those of the protrusion 64 and the second protrusion 65. That is, these upper protrusions 66 are portions slightly protruding from the inner peripheral surface of the through-hole 63, and an area in contact with the pillar 43 is narrower than those of the protrusion 64 and the second protrusion 65.

Further, a plurality of the upper protrusions are provided on the inner peripheral surface of the through-hole 63, and these plurality of upper protrusions 66 are arranged separately on the left and right of the protrusion 64 in a case of seeing through the tubular portion 61 in a direction of seeing the protrusion 64 (or the second protrusion 65) in front.

In the present embodiment, the left and right upper protrusions 66 are spaced equidistantly from the protrusion 64, but are not limited in this way, and may be arranged separately on the left and right of the protrusion 64.

When the pillar 43 is inserted through the through-hole 63 of the headrest guide 52 configured as described above, the pillar 43 is in a state of abutting on the plurality of protrusions 64, 65, and 66, as shown in FIG. 10.

The pillar 43 shown in FIG. 10 is of a straight type projecting straight downward from the lower end part of the headrest 4, and at a position indicated by an arrow 11, the pillar 43 and the inner peripheral surface of the through-hole 63 are in a state of what is called "touching with zero clearance (also called abutting with zero clearance)". That is, the pillar 43 and the inner peripheral surface of the through-hole 63 are in a touching state. Further, at a position indicated by an arrow Y2, the pillar 43 and the second protrusion 65 are in a state of touching with zero clearance.

In addition, at a position indicated by an arrow Y3, the pillar 43 and the upper protrusions 66 are in a state of being in firm contact, and in some cases, the headrest guide 52 is elastically deformed. Further, at a position indicated by an arrow 14, the pillar 43 and the protrusion 64 are in a state of being in firm contact, and in some cases, the headrest guide 52 is elastically deformed.

The pillar 43 shown in FIG. 11 is of a curved type projecting downward from the lower end part of the headrest 4 while being curved forward, and is denoted by the reference character 43A for ease of description to distinguish from the straight-type pillar 43.

At a position indicated by an arrow Y5, the pillar 43A and the inner peripheral surface of the through-hole 63 are in a state of touching with zero clearance. Further, at a position indicated by an arrow Y6, the pillar 43A and the protrusion 64 are in a state of touching with zero clearance.

In addition, at a position indicated by an arrow Y7, the pillar 43A and the upper protrusions 66 are in a state of being in firm contact, and in some cases, the headrest guide 52 is elastically deformed. Further, at a position indicated by an arrow Y8, the pillar 43A and the second protrusion 65 are in a state of being in firm contact, and in some cases, the headrest guide 52 is elastically deformed.

Note that, although the straight-type pillar 43 and the curved-type pillar 43A have been described in the present embodiment, they should only come into contact with the plurality of protrusions 64, 65, and 66 formed on the inner peripheral surface of the through-hole 63, and are thus not limited in shape.

Figure 5:
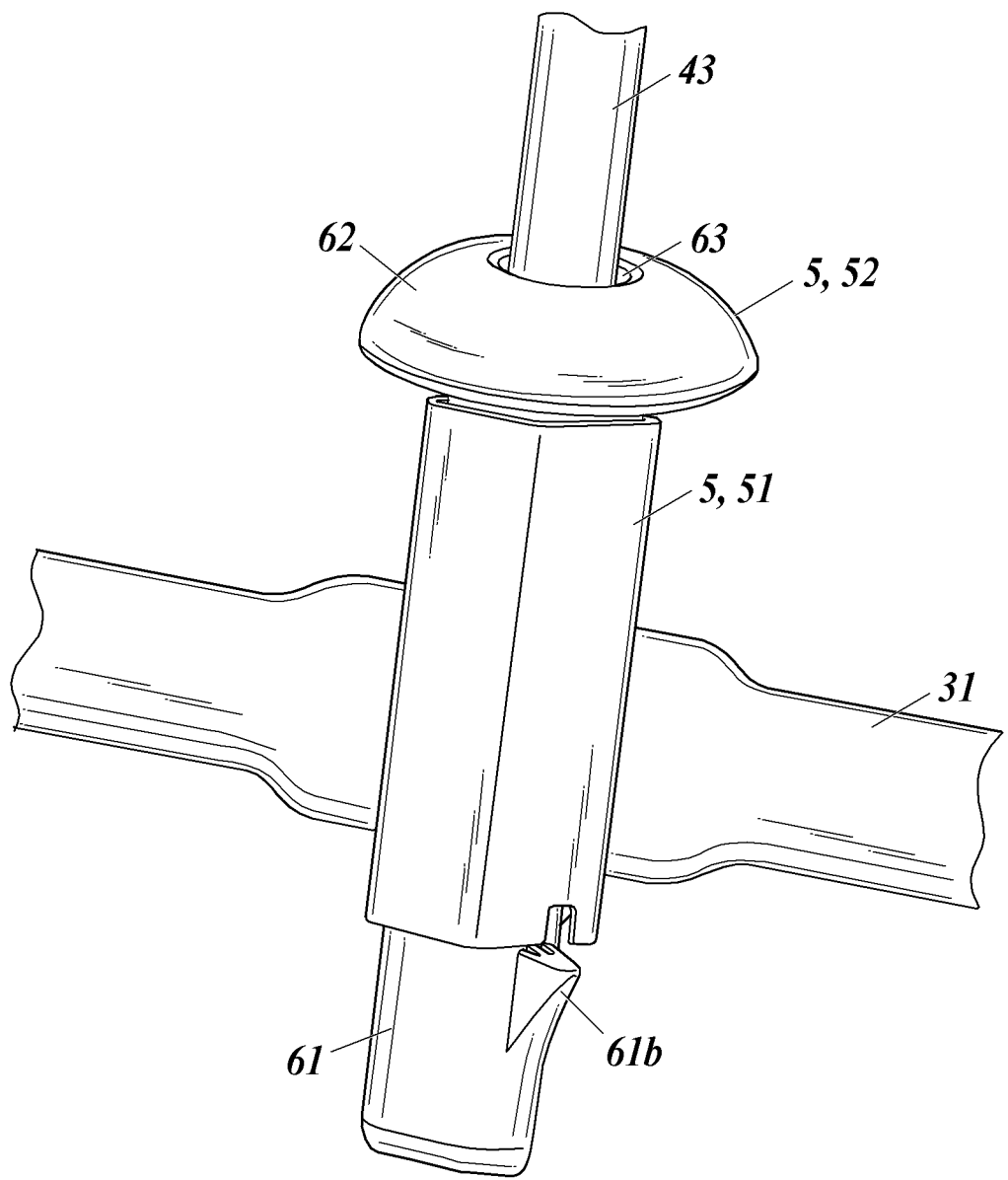
FIG. 5 is a perspective view showing an essential part of the structure for supporting the headrest.

When the headrest guide 52 configured as described above is held by the holder 51, at least part of the protrusion 64 and the second protrusion 65 is provided on the inner peripheral surface of the through-hole 63 in a region not held by the holder 51 in the tubular portion 61 as shown in FIG. 5 and FIG. 6.

Describing in more detail, the headrest guide 52 is held by the holder 51 in a manner protruding from an opening at the lower end part of the holder 51. In this state, the pawl 61b is positioned below the lower end surface of the holder 51, and functions as a withdrawal stop for the headrest guide 52. In addition, a region of the headrest guide 52 positioned below the upper end part of the pawl 61b is in a state of not being held by the holder 51. That is, part f f the protrusion 64 and the second protrusion provided on the inner peripheral surface of the through-hole 63 is in a state of being provided in the region not held by the holder 51. In addition, the upper protrusions 66 is also in a state of being provided in the region not held by the holder 51 as being provided on the inner peripheral surface of the through-hole 63 in the head 62.

If the entire tubular portion 61 is held by the holder 51, for example, the tubular portion 61 is less likely to be deformed, which makes it difficult to insert the pillar 43 through the through-hole 63. In contrast, if the position at which each of the protrusions 64, 65, and 66 comes into firm contact with the pillar 43 when inserting the pillar 43 through the through-hole 63 is at a place not held by the holder 51, an advantage in that the headrest guide 52 easily deflects when inserting the pillar 43 is brought about.

According to the present embodiment as described above, since the length in the vertical direction of the protrusion 64 extending along the longitudinal direction of the tubular portion 61 is set to be longer than the length in the lateral or fore-aft direction, a range where the protrusion 64 abuts on the pillar 43 (43A) inserted through the through-hole 63 increases. Therefore, backlash of the headrest 4 can be suppressed.

In addition, since the protrusion 64 is provided on the inner peripheral surface of the through-hole 63 in a range including the vicinity of the lower end part of the tubular portion 61, backlash of the headrest 4 can be suppressed further when the pillar 43 (43A) is inserted deep through the through-hole 63.

In addition, since the protrusion 64 projects along the fore-aft direction from the inner peripheral surface of the through-hole 63, backlash of the headrest 4 in the fore-aft direction can be suppressed.

In addition, since the tubular portion 61 has the second protrusion 65 provided at the position opposite to the protrusion 64 in the fore-aft direction on the inner peripheral surface of the through-hole 63, backlash of the headrest 4 in the fore-aft direction can be suppressed further by means of the protrusion 64 and the second protrusion 65 opposite in the fore-aft direction.

In addition, since the length in the vertical direction of the second protrusion 65 is set to be shorter than the length in the vertical direction of the protrusion 64, the sliding resistance to the pillar 43 (43A) can be suppressed as compared with the protrusion 64. It is therefore possible to make it easier to insert the pillar 43 (43A) through the through-hole 63 while suppressing backlash of the headrest 4.

In addition, since the length in the lateral direction of the second protrusion 65 is set to be shorter than the length in the lateral direction of the protrusion 64, the sliding resistance to the pillar 43 (43A) can be suppressed as compared with the protrusion 64. It is therefore possible to make it easier to insert the pillar 43 (43A) through the through-hole 63 while suppressing backlash of the headrest 4.

In addition, since the tubular portion 61 has the upper protrusions 66 spaced from the protrusion 64 in the vertical direction on the inner peripheral surface of the through-hole 63 and provided above the central part in the vertical direction of the tubular portion 61, the tubular portion 61 abuts on the pillar 43 (43A) at a position where the protrusion 64 and the upper protrusions 66 are spaced vertically, and backlash of the headrest 4 can be suppressed further.

In addition, since the length in the vertical direction of the upper protrusions 66 is set to be shorter than the length in the vertical direction of the protrusion 64, a range where the upper protrusions 66 abut on the pillar 43 (43A) is narrowed, and the sliding resistance to the pillar 43 (43A) can be suppressed as compared with the protrusion 64. It is therefore possible to make it easier to insert the pillar 43 (43A) through the through-hole 63.

In addition, the plurality of upper protrusions 66 provided on the inner peripheral surface of the through-hole 63 are arranged separately on the left and right of the protrusion 64 in a case of seeing through the tubular portion 61 in a direction of seeing the protrusion 64 in front. Therefore, the protrusion 64 and the plurality of upper protrusions 66 spaced in the vertical direction and in the lateral direct n t on the pillar 43 (43A), and backlash of the headrest 4 can be suppressed further.

In addition, since the headrest 4 has the holder 51 provided at the upper part of the seat frame 31 constituting the seatback 3 to hold part of the tubular portion 61 of the headrest guide 52, the part of the tubular portion 61 can be held by the holder 51, and backlash of this headrest 4 can be suppressed while allowing the headrest 4 with the pillar 43 (43A) inserted through the through-hole 63 of the tubular portion 61 to follow the movement of seat arrangement.

In addition, since at least part of the protrusion is provided on the inner peripheral surface of the through-hole 63 in a region not held by the holder 51 in the tubular portion 61, the headrest guide 52 easily deflects, which contributes to a reduction in operation load on the headrest 4.

Note that, in the present embodiment, the protrusion 64, the second protrusion 65, and the plurality of upper protrusions 66 shall be provided on the inner peripheral surface of the through-hole 63, but they are not limited in this way.

That is, only the protrusion 64 may be provided on the inner peripheral surface of the through-hole 63.

Alternatively, the upper protrusions 66 may not exist on the inner peripheral surface of the through-hole 63, but only the protrusion 64 and the second protrusion 65 may be provided.

Alternatively, the second protrusion 65 may not exist on the inner peripheral surface of the through-hole 63, but only the protrusion 64 and the upper protrusions 66 may be provided.

Alternatively, one or more upper protrusions 66 may be provided on the inner peripheral surface of the through-hole 63. In a case where there is one upper protrusion 66, it is desirable to be formed so as to project forward from the rear side surface of the inner peripheral surface of the through-hole 63, rather than on either the left or right of the protrusion 64. That is, in such a case, the protrusion 64 and the one upper protrusion 66 are positioned on the same vertical plane.

INDUSTRIAL APPLICABILITY

The headrest guide and the vehicle seat according to the present invention can suppress backlash of the headrest even with a simplified structure compared with conventional structures, and therefore provide high industrial applicability.

REFERENCE SIGNS LIST 1 vehicle seat
2 seat cushion
3 seatback
31 seat frame
4 headrest
43 pillar
43A pillar
5 support structure
51 holder
52 headrest guide
61 tubular portion
64 protrusion
65 second protrusion
66 upper protrusion
62 head
63 through-hole

The invention claimed is:
1. A headrest guide that holds a pillar projecting from a headrest, the headrest guide comprising:
  a tubular portion with a through-hole which is formed along a length direction and through which the pillar is inserted,
  wherein
  the tubular portion has a protrusion provided on an inner peripheral surface of the through-hole to abut on the pillar inserted through the through-hole,
  the protrusion extends along a longitudinal direction of the tubular portion, and a length in a vertical direction of the protrusion is set to be longer than a length in a lateral or fore-aft direction of the protrusion, and
  no protrusion is provided at a central part in a vertical direction of the tubular portion and the protrusion is provided above or below the central part.
2. The headrest guide according to claim 1, wherein the protrusion is provided on the inner peripheral surface of the through-hole at a lower end part of the tubular portion.

3. The headrest guide according to claim 1, wherein the protrusion projects from the inner peripheral surface of the through-hole along the fore-aft direction.

4. The headrest guide according to claim 1, wherein the tubular portion has a second protrusion provided at a position opposite to the protrusion in the fore-aft direction on the inner peripheral surface of the through-hole.

5. The headrest guide according to claim 4, wherein a length in the vertical direction of the second protrusion is set to be shorter than a length in the vertical direction of the protrusion.

6. The headrest guide according to claim 4, wherein a length in the lateral direction of the second protrusion is set to be shorter than a length in the lateral direction of the protrusion.

7. The headrest guide according to claim 1, wherein
the protrusion is provided below the central part in the vertical direction of the tubular portion, and
the tubular portion has an upper protrusion spaced from the protrusion in the vertical direction on the inner peripheral surface of the through-hole and provided above the central part in the vertical direction of the tubular portion.

8. The headrest guide according to claim 7, wherein a length in the vertical direction of the upper protrusion is set to be shorter than the length in the vertical direction of the protrusion.

9. The headrest guide according to claim 7, wherein
a plurality of the upper protrusions are provided on the inner peripheral surface of the through-hole, and
the plurality of upper protrusions are arranged separately on left and right of the protrusion.

10. A vehicle seat, comprising:
a seat cushion that supports buttocks of an occupant;
a seatback attached rotatably to the seat cushion;
a headrest provided at an upper part of the seatback; and
a headrest guide that holds a pillar projecting from the headrest,
wherein
the headrest guide comprises a tubular portion with a through-hole which is formed along a length direction and through which the pillar is inserted,
the tubular portion has a protrusion provided on an inner peripheral surface of the through-hole to abut on the pillar inserted through the through-hole,
the protrusion extends along a longitudinal direction of the tubular portion, and a length in a vertical direction of the protrusion is set to be longer than a length in a lateral or fore-aft direction of the protrusion,
a seat frame constituting the seatback is provided with a holder that holds part of the tubular portion of the headrest guide, and
at least part of the protrusion is provided on the inner peripheral surface of the through-hole in a region not held by the holder in the tubular portion.

* * * * *